United States Patent [19]
Hartz

[11] Patent Number: 5,289,614
[45] Date of Patent: Mar. 1, 1994

[54] EXTRA-VEHICULAR ACTIVITY TRANSLATION TOOL

[75] Inventor: Leslie S. Hartz, Seabrook, Tex.

[73] Assignee: The United States of America as represented by the United States National Aeronautics and Space Administration, Washington, D.C.

[21] Appl. No.: 931,468

[22] Filed: Aug. 21, 1992

[51] Int. Cl.⁵ .............................................. E05B 1/00
[52] U.S. Cl. ................................... 16/114 R; 16/125; 294/1.1; 248/205.3
[58] Field of Search ................ 16/125, 114 R, 116 R, 16/111 R; 294/1.1, 65.5; 248/205.3

[56] References Cited

U.S. PATENT DOCUMENTS

| | | | |
|---|---|---|---|
| 1,655,744 | 1/1928 | Swanby | 16/125 |
| 2,954,257 | 9/1960 | Besuch et al. | 294/65.5 |
| 2,970,003 | 1/1961 | Heath, Jr. et al. | 294/65.5 |
| 2,976,075 | 3/1961 | Budreck | 294/65.5 |
| 3,484,894 | 12/1969 | Fletcher | 16/114 R |
| 3,778,094 | 12/1973 | Grolet et al. | 294/1.1 |
| 4,328,761 | 5/1982 | Dwyer | 16/114 R |
| 4,850,502 | 7/1989 | Davis | 220/94 R |

Primary Examiner—Paula A. Bradley
Assistant Examiner—Chuck Y. Mah
Attorney, Agent, or Firm—Russell E. Schlorff; Guy M. Miller; Edward K. Fein

[57] ABSTRACT

A portable a hand-grip device having a base member overlaid by a flexible pad having its opposite ends releasably secured to the base. The pad includes an adhesive-covered surface which may be attached to a flat surface. A plurality of closely-spaced elongated rigid members are arranged side-by-side across the back of the flexible sheet to reinforce the flexible pad. The ends of these reinforcing members project beyond the opposite sides of the base and flexible pad. A selectively-operable mechanism on the base member releasably captures the outer ends of the reinforcing members and secures them when the pad member is attached to a flat surface and provides a load path between a handle on the base and the flexible pad. The selectively-operable mechanism is further arranged to selectively release the reinforcing members so that the device may be progressively peeled away from a wall surface.

15 Claims, 2 Drawing Sheets

EXTRA-VEHICULAR ACTIVITY TRANSLATION TOOL

ORIGIN OF THE INVENTION

The invention described herein was made by an employee of the U.S. Government and may be manufactured and used by or for the Government of the United States without the payment of any royalties thereon or therefor.

BACKGROUND OF THE INVENTION

1. Field of the Invention

Situations may arise in outer space where an astronaut must make an unscheduled extra-vehicular trip outside of an orbiting space vehicle. Emergencies can arise, for example, where an astronaut must travel along the smooth surfaces of a space vehicle to reach a remote faulty device.

The general purpose of this invention is to allow an astronaut to move along the outside of the Orbiter while in space. In an emergency situation an astronaut might need to translate along the outside of the Orbiter in order to gain access to failed hardware. For example, if the Orbiter External Tank doors fail to shut properly, an astronaut would need to travel from the Payload Bay, down the side of the Orbiter, around the wing, and to the External Tank doors located on the underside of the Orbiter vehicle. Except for the translation handles in the payload bay, the outside of the Orbiter is smooth and has essentially nothing for the crew members to grasp and propel themselves along with. This invention provides a way for astronauts to stick handles to the outside of the Orbiter and to build a translation path to any area on the Orbiter vehicle.

2. Background Art

Heretofore so-called "EVA" or extra-vehicular activities which have been made by astronauts outside of an orbiting spacecraft have been typically carried out by using special devices such as hand-carried propulsion devices or back pack rocket systems to control their movements to and from remote areas of the spacecraft. Although travel inside of a space vehicle is less arduous, it is nevertheless difficult for crew members to move freely back and forth within the crew cabin or the cargo bay of a spacecraft such as the orbiter unless there are various devices or equipment along the intended travel path of the astronaut which may be grasped.

OBJECTS OF THE INVENTION

Accordingly, it is an object of the present invention to provide new and improved apparatus for facilitating the free travel of astronauts along unplanned travel paths which are lying either within or outside of orbiting spacecraft.

It is a further object of the invention to provide new and improved portable supports cooperatively arranged to be temporarily adhered at spatially-disposed random locations along the wall surfaces of a spacecraft so that astronauts may grasp these devices to propel themselves between those selected locations and then subsequently removed whenever travel therebetween is to be subsequently discontinued.

SUMMARY OF THE INVENTION

These and other objects of the invention are attained by a portable hand-grip device having a base member which is overlaid by a sheet of a flexible material which is secured at its opposite ends to the base. A flexible pad mounted on the flexible sheet includes an adhesive-covered forward surface arranged to be releasably bonded to a smooth wall surface. A plurality of closely-spaced elongated rigid members are arranged in a side-by-side relationship across the backside of the flexible sheet to reinforce the flexible pad with the ends of these reinforcing members projecting beyond the opposite sides of the base member and the edges of the flexible pad. A selectively-operable mechanism on the base member includes elongated retainer members operable for releasably capturing the outer end portions of the rigid members and securing them against the base member when the flexible pad member is to be adhesively secured to a smooth wall surface. The selectively-operable mechanism is further arranged to be selectively moved to a releasing position where the retainer members are no longer capturing the outer end portions of the rigid members so that the base member may be moved in relation to the rigid members whenever the flexible pad member is to be progressively peeled away from a wall surface.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as illustrated in the accompanying drawings, in which:

DETAILED DESCRIPTION OF THE PREFERRED EMBODIMENT

Figure 1:
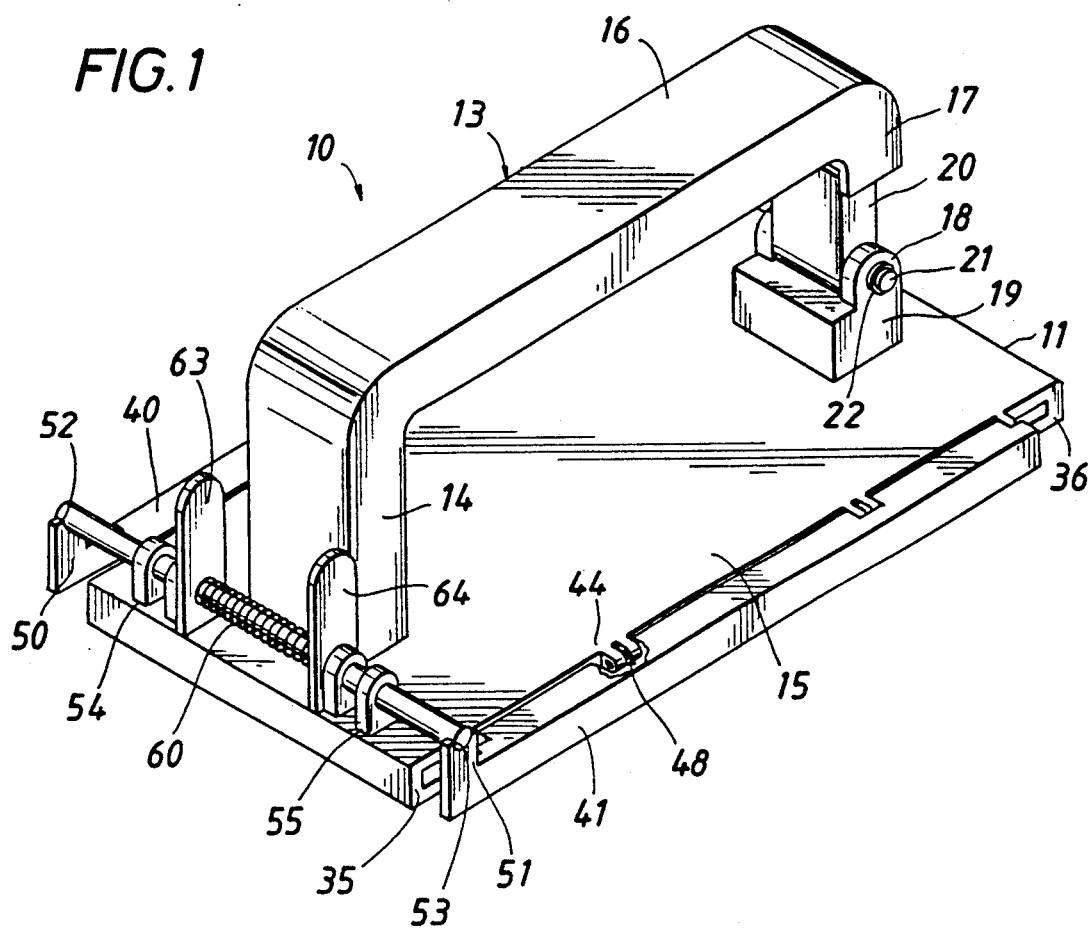
FIG. 1 is an isometric view of a preferred embodiment of the apparatus of the present invention specially arranged to be manually gripped by the gloved hand of an astronaut and depicting that new and improved apparatus as it appears when looking downwardly toward its upper surface.

Turning now to FIG. 1, an isometric view is shown of a preferred embodiment of a hand-grip tool 10 cooperatively arranged in accordance with the principles of the present invention. It will, of course, be appreciated that the tool 10 can be placed in many different positions as it is being utilized in the practice of the invention. Nevertheless, in FIG. 1 the tool 10 is portrayed from the perspective of an observer looking generally downwardly toward the hand-grip tool, with what may be arbitrarily described as being the forward left-hand corner of an oblong or quadrangular base member 11 of the tool being in the foreground of that view. It should be noted at this point that in the interest of using a consistent nomenclature throughout the forthcoming description, the orientations of the various ends, surfaces and edges of the elements of the tool 10 will be arbitrarily described from the perspective of a viewer of the isometric drawing of the hand-grip tool portrayed in FIG. 1. It is to be understood, therefore, that none of the orientational descriptions used herein are to be construed as limiting either the movements or the relative placements of the new and improved hand-grip tool 10 as it is being utilized in keeping with the objects of the invention.

In the preferred embodiment of the new and improved hand-grip tool 10, the base member 11 has a planar front surface (generally indicated at 12 in FIG. 2) that is not visible in FIG. 1 but, from the perspective of a viewer of FIG. 1, is the flat underside of the base as depicted in that particular view. To facilitate the utilization of the hand-grip tool 10, the tool further includes a handle such as a standard so-called "EVA handle" 13 with an upright pedestal 14 centrally mounted on the visible upper rear surface or backside 15 of the base 11 adjacent to the leading end of the base member (i.e., its forward or advanced end from the perspective of the viewer of FIG. 1). The tool handle 13 further includes an elongated hand-gripping portion 16 that is generally perpendicular to the pedestal 14 and extends rearwardly therefrom at a sufficient distance above the backside 15 of the base 11 to conveniently accommodate the gloved hand of an astronaut with the index finger and thumb (not shown in the drawings) positioned at the forward end of the hand-gripping portion adjacent to the pedestal 14.

It will, of course, be recognized that the hand-grip tools 10 of the present invention may be advantageously employed at various locations on a spacecraft with nothing more than a generally L-shaped handle. Nevertheless, to enhance the utility of the hand-grip tools 10, the gripping portion 16 of the handle 13 is terminated with a downwardly-turned end portion 17 which is aligned with a bifurcated upper end 18 of an upright post 19 that is mounted on the backside 15 of the base member 11 adjacent to the trailing or rearward edge of the base (i.e., its more distant edge as viewed in FIG. 1). The lower end of an elongated catch 20 is pivotally coupled to the upright post 19 by means such as a transverse pivot pin 21 supported between the bifurcated upper end 18 of the post. Biasing means are provided such as a torsion spring 22 coiled around the pivot pin 21 for normally urging the catch member 20 rearwardly to position a rearwardly-facing notch 23 on the upper end of the catch within a complementary forwardly-facing recess 24 in the depending free end portion 19 of the hand-gripping portion 16 of the handle 13. It will be seen, therefore, that by momentarily pressing the pivoted catch member 20 inwardly sufficiently to displace its upper end out of the recess 24, a support or guide member such as a tether or hand rope (neither shown in the drawings) may be readily installed within the enclosed space defined between the handle 13 and the base member 11 for reliably capturing the rope within the handle once the spring-loaded catch is returned to its normal latching position. Accordingly, by deploying a group of the hand-grip tools 10 at selected intervals along an interior or exterior wall of a spacecraft, the ends of a hand rope can be secured or tied to the first and last of the deployed tools so that intermediate portions of the guide rope can be readily trapped within the respective handles 13 of the intermediately-located tools without having to tediously thread the rope through those handles. In this manner, a group of the hand-grip tools 10 can be quickly deployed for conveniently establishing a defined path along which astronauts can readily maneuver by simply pulling themselves back and forth along the guide member.

Figure 4:
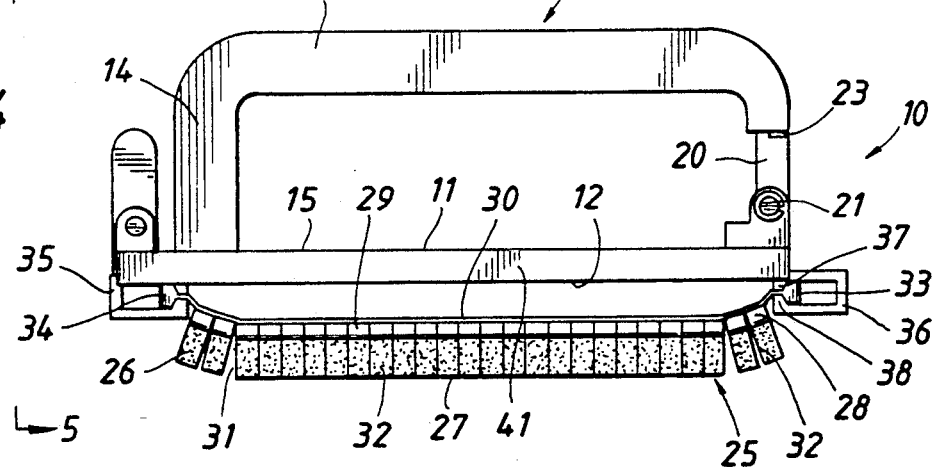
FIGS. 4 and 5 are respectively similar to FIGS. 2 and 3 but instead depict the new and improved hand-grip tool of the invention after it has been disengaged from a surface.
Figure 5:
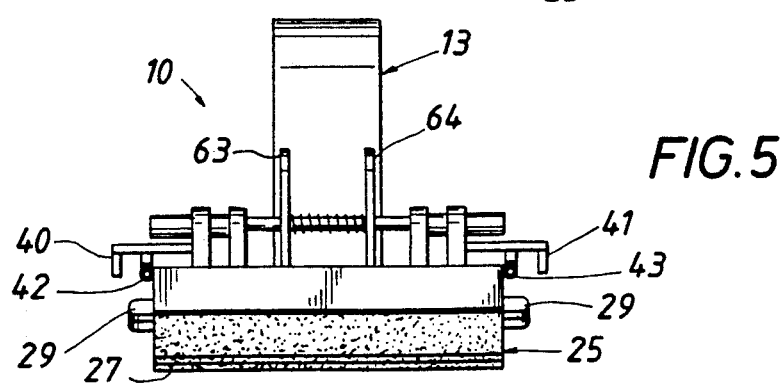

The new and improved tool 10 further includes a unique selectively-releasable flexible gripping member 25 which is preferably arranged with a quadrangular configuration that substantially conforms to the planar front face 12 of the base member 11. As best illustrated in FIGS. 4 and 5, in the preferred embodiment of the hand-grip tool 10, the flexible gripping member 25 is comprised of a rectangular pad 26 formed of a pliable foam rubber block of a uniform thickness having a suitable contact adhesive 27 coating at least on the central portion of its exposed or forward face. The gripping member 25 further includes a plurality of closely-spaced support members or stiffening ribs 28 which are arranged transversely in a side-by-side relationship across the rearward face or backside of the pliable pad 26, with the ribs having sufficient length that the respective terminal ends 29 of the elongated ribs will project a short distance beyond the opposite sides or longitudinal edges of the base member 11. To maintain the transverse stiffening ribs 28 in a closely-spaced parallel arrangement on the backside of the pad member 26, the gripping member 25 further includes a rectangular sheet of a flexible backing material 30 which is firmly bonded to each of the ribs for securely maintaining them in their respective side-by-side positions across the backside of the pad member 26.

The stiffening ribs 28 can, of course, be separately formed and mounted on the flexible backing material 30. Nevertheless, in the preferred manner of fabricating the illustrated flexible gripping member 25, a thin rectangular sheet of metal or stiff plastic is initially bonded to the backside of the pliable pad 26. As will be appreciated by viewing FIG. 4, the several ribs 28 are then formed by cutting a plurality of closely-spaced, transverse slits through this stiff rectangular sheet which, as shown at 31 in FIG. 2, also extend on through the pliable pad 26. By virtue of the preferred manner of fabricating the gripping member 25, the parallel transverse slits 31 in the pliable pad 26 will be respectively aligned with the corresponding transverse spaces between the stiffening ribs 28 to divide the pliable pad into individual narrow paralleled segments, as at 32, which are separately bonded to their corresponding contiguous rib. It should be particularly noted that the narrowness of the individual segments 32 as well as the alignment of the parallel slits 31 with their corresponding transverse spaces between the reinforcing ribs 28 greatly facilitate the transverse bending of the flexible gripping member 25 whenever the base 11 is tilted in a heel-to-toe motion in relation to an adjacent surface.

In keeping with the objects of the present invention, the flexible backing sheet 30 is cooperatively arranged to be somewhat slack when it is mounted on the base member 11. To accomplish this, the backing sheet 30 is appropriately sized so that whenever it is mounted on the base 11, the overall length of the flexible sheet is somewhat greater than the longitudinal length of the base member. In this manner, the base 11 will normally be free to be moved sufficiently in relation to the flexible backing sheet 30 that the adhesive 27 on the forward face of the pliable pad member 26 can be progressively disengaged or pulled out of contact with the rear face of the backing sheet whenever the gripping member 25 is adhered to a wall surface. It will be appreciated, therefore, that so long as the base 11 is free to be pulled away slightly or disengaged from the flexible backing sheet 30, the base member is capable of being moderately shifted or moved independently of the gripping member 25.

In the preferred manner of coupling the backing sheet 30 to the base member 11, the forward and rearward transverse ends of the backing sheet 30 are doubled over as generally depicted at 33 and 34 in FIGS. 1 and 4. These doubled-over terminal portions 33 and 34 are securely coupled to the opposite transverse ends of the base 11 by means such as U-shaped channels or retainers 35 and 36 respectively arranged along the leading and trailing ends of the base member. The transverse retainers 35 and 36 are respectively provided with inwardly-turned, opposing longitudinal edges, as at 37 and 38, which are moderately separated to define a narrow gap for trapping the doubled-over enlarged ends 33 and 34 of the flexible backing sheet within the retainers. The U-shaped retainers 35 and 36 may, of course, be formed either as integral portions of the base 11 or as separate members which are securely mounted along the leading and trailing ends of the base member.

Accordingly, as will be subsequently explained in greater detail, whenever the base 11 is free to move moderately in relation to the flexible gripping member 25, the preferred manner of operating the hand-grip tool 10 is to tilt or roll the base member upwardly in a heel-to-toe pivotal motion about the lower transverse edge of one of the two retainers 35 and 36. Then, as the base member 11 is pivoted about the lower edge of one of the transverse retainers 35 or 36, the other of the two retainers will be correspondingly elevated in order to successively pull the adhesive-coated faces 27 of the narrow transverse segments 32 of the gripping member 25 away from an adjacent spacecraft wall. It must, of course, be appreciated that the base 11 may also be rocked or rolled over sideways onto one or the other of the two longitudinal edges of the gripping member 25 so as to raise its opposite longitudinal edge to progressively lift the adhesive-coated outer face 27 of the gripping member away from an adjacent spacecraft wall. It will be recognized, therefore, that so long as the base member 11 is free to be moved even moderately in relation to the gripping member 25, the respective adhesive-coated faces 27 of the individual segments 32 comprising the pliable pad 26 can be disengaged from a spacecraft wall by appropriately manipulating the base member so as to successively lift the front faces of the individual segments out of contact with the surface of the wall.

In keeping with the objects of the present invention, the hand-grip tool 10 further includes selectively-releasable retainer means arranged to normally maintain the flexible gripping member 25 pressed against the flat face 12 of the base member 11. In the preferred manner of accomplishing this, elongated U-shaped channels 40 and 41 are respectively arranged along the opposite longitudinal sides of the base 11 with the open sides of these channels facing inwardly toward the base member. The two channels 40 and 41 are respectively journalled on axles or elongated rods 42 and 43 which are disposed in longitudinal bores through the upper flanges of the channels and, as shown generally at 44 in FIG. 1, pivotally coupled to the opposite sides of the base 11 by means of a plurality of laterally-extending bosses spatially disposed along the sides of the base and respectively projected outwardly into inwardly-facing complemental notches formed in the upper flanges of the channels. In this manner, the inwardly-facing U-shaped channels 40 and 41 are each cooperatively arranged for pivotal movement between their pad-latching and pad-releasing positions as respectively depicted in FIGS. 3 and 5. The retainer means further include biasing means such as coil springs 48 and 49 respectively disposed around the elongated rods 42 and 43 and cooperable for normally pivoting the elongated U-shaped channels 40 and 41 outwardly and upwardly away from the sides of the base member 11 to their elevated pad-releasing positions shown in FIG. 4.

Figure 2:
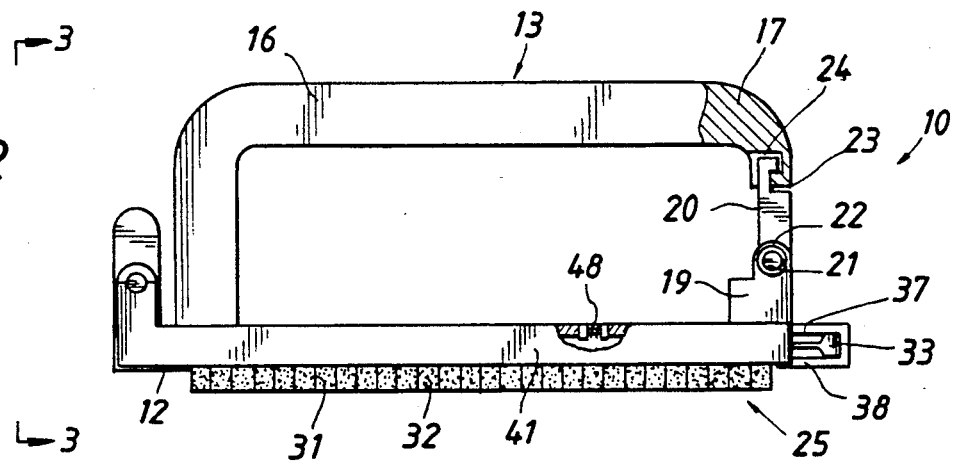
FIG. 2 is an elevational side view of the portable hand-grip tool of the invention and illustrating the new and improved apparatus as it might appear while it is releasably secured to a wall surface.
Figure 3:
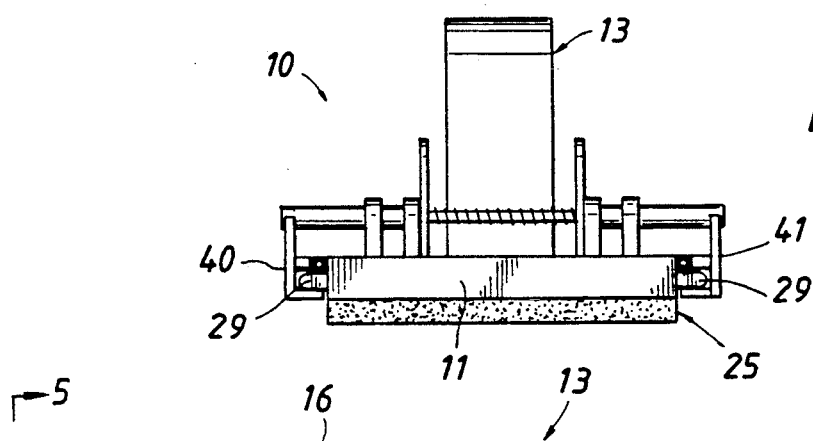
FIG. 3 is an elevational end view of the apparatus of the present invention which is taken along the lines "3—3" in FIG. 2.

Accordingly, as illustrated in FIGS. 2 and 3, whenever the elongated U-shaped channels 40 and 41 are respectively disposed in their lower pad-latching positions along the longitudinal edges of the base member 11, the ends 29 of the rib members 28 respectively projecting beyond the opposite sides of the gripping member 25 will be captured within the channels. Thus, in keeping with the objects of the present invention, so long as the projecting terminal ends 29 of the closely-spaced transverse ribs 28 are trapped within the channels 40 and 41, the base member 11 is firmly secured from being moved away from the flexible gripping member 25. It will, therefore, be appreciated from FIGS. 2 and 3 that so long as the terminal ends 29 of the transverse ribs 28 are respectively captured within the U-shaped channels 40 and 41 there will be a so-called "load path" extending from the handle 16 to the adhesive-coated outward faces 27 of the transverse segments 32 of the gripping member 25 that are adhered to a spacecraft wall surface. Thus, whenever an astronaut pulls outwardly on the handle 16, that pulling force will be distributed through the base member 11 to the U-shaped channels 40 and 41; and, from there, the force will be acting against the terminal ends 29 of the parallel transverse ribs 28 incorporated in the flexible gripping member 25.

Figure 6:
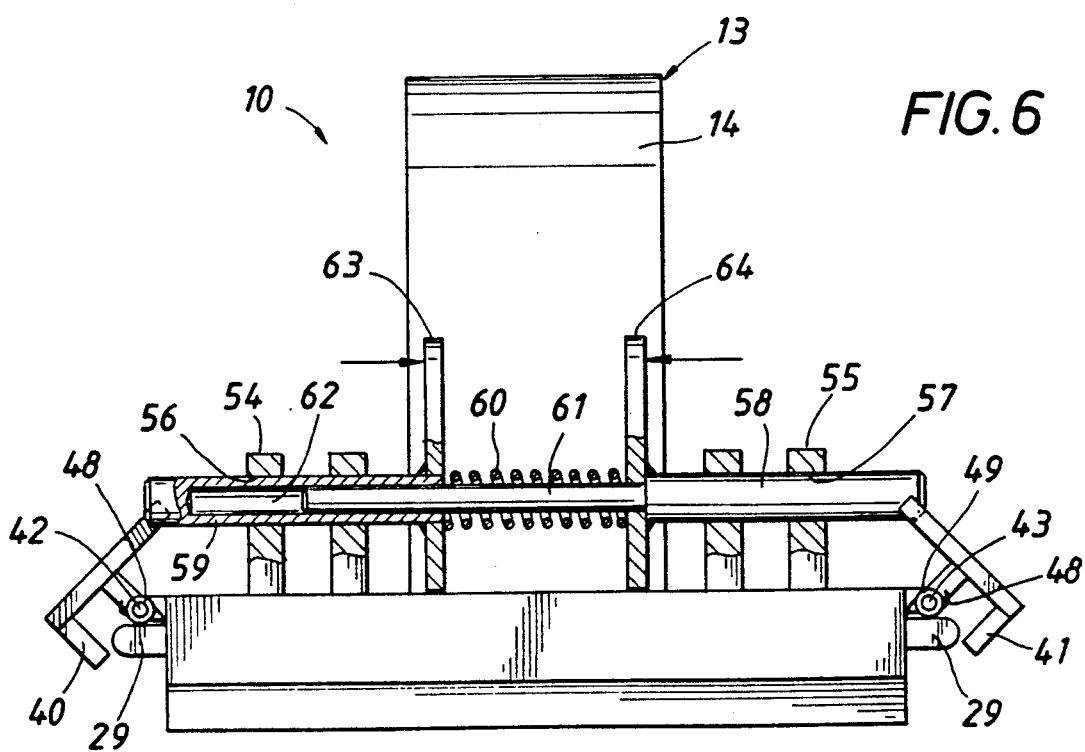
FIG. 6 is an elevational end view similar to FIG. 5 which has been enlarged with portions thereof partially broken away for better illustrating various details of the hand-operated release mechanism of the tool of the invention which is selectively operable for disengaging the new and improved apparatus from a wall surface.

On the other hand, it will be realized that by pivoting the elongated channels 40 and 41 upwardly and outwardly to their respective elevated pad-releasing positions depicted in FIGS. 4-6, the terminal ends 29 of the ribs 28 will no longer be confined within the channels. Once this is done, the base member 11 will then be free to be moved moderately in relation to the transverse ribs 28 within the flexible gripping member 25.

As previously mentioned, in FIG. 1 the hand-grip tool 10 is portrayed as it will be situated when an astronaut's hand (not illustrated in the drawings) is grasping the hand-gripping portion 16 of the handle 13 with the opposed thumb and index fingers on opposite sides of the pedestal 14 in readiness for operating the retainer means to release of the elongated channels 40 and 41 for pivotal movement to their elevated pad-releasing positions. Accordingly, as best seen in FIGS. 1 and 6, the preferred embodiment of the retainer means includes uprights 50 and 51 which are respectively mounted on the forward ends of the elongated channels and provided with upwardly-opening notches 52 and 53 on their upper ends. Upright posts, as at 54 and 55, are spatially disposed along the forward portion of the base member 11 and arranged with axially-aligned openings, as at 56 and 57, for slidably supporting opposed stop members 58 and 59 for longitudinal movement back and forth along a common axis lying above the forward portion of the base member and intersecting the notches 52 and 53.

As best seen in FIG. 1, the opposed stop members 58 and 59 are cooperatively arranged so that their outer free ends will be normally disposed within the upwardly-facing notches 52 and 53. Biasing means such as a stout coil spring 60 is arranged for normally urging the elongated stop members 58 and 59 outwardly to their respective extended positions for selectively retaining the elongated channels 40 and 41 in their depicted pad-latching positions. To facilitate the manual operation of the retainer means, an elongated guide member such as an axially-aligned rod 61 projecting from the inward end of the elongated stop member 58 is coaxially arranged within the coil spring 60 and movably fitted within a complementary axial counterbore 62 in the opposing inward end of the other stop member 59. Upstanding tabs 63 and 64 are respectively arranged on the stop members 58 and 59 and positioned on opposite sides of the handle 13 for convenient engagement by the opposed thumb and index finger (not shown in the drawings) of an astronaut gripping the handle portion 16.

Accordingly, from the foregoing description of the new and improved hand-grip tool 10 of the invention, it will be appreciated that these tools may be releasably secured to many of the substantially-flat exterior or interior surfaces on the walls or equipment of a spacecraft (not illustrated) whenever the elongated channels 40 and 41 are respectively situated in their pad-latching positions depicted in FIGS. 1-3. Thus, with the elongated channels 40 and 41 in those positions, the terminal portions 29 of the rib members 28 projecting from opposite sides of the flexible gripping member 25 will be captured within the channels; and, as previously described, the engagement of the opposed stop members 54 and 55 with the upright tab members 50 and 51 on the channels will reliably retain the elongated channels in their respective pad-latching positions. So long as the exposed terminal portions 29 of the closely-spaced ribs 28 are confined within the channels 40 and 41, the combined strength of the ribs will maintain the flexible gripping member 25 substantially flat and thereby keep its entire rear surface firmly pressed against the planar front surface 12 of the base 11.

As previously described, by keeping the gripping member 25 firmly engaged against a wall surface, the full strength of the contact adhesive 27 will be effective for carrying the loads which will be imposed on the handle 13 such as when an astronaut is holding onto the handle. It will be realized that loads imposed on the flexible gripping member 25 will be uniformly distributed across the entire surface area of the pad 26. The weightlessness conditions typically experienced in outer space will, of course, greatly minimize the bonding requirements of the contact adhesive 27 as well as reduce the necessary surface area of the gripping member 25 needed to meet particular load criteria. It should be noted at this point that by virtue of the inherent nature of typical contract adhesives, as at 27, the hand-grip tools 10 can be randomly positioned on convenient surfaces on the interior and exterior of a spacecraft without having to predetermine those locations. On the other hand, if a special material such as Velcro is to be substituted for the contact adhesive 27, complementary patches of the special material must, of course, be previously mounted at the predetermined locations where the hand-grip tools 10 of the invention might be used. As previously discussed by reference to FIGS. 4-6, once the hand-grip tool 10 is to be disengaged from a spacecraft wall, the opposed thumb and index finger of an astronaut's hand are brought together (as indicated by the directional arrows 65) for shifting the stop members 58 and 59 inwardly for momentarily retracting the free ends of the stop members 50 and 51 out of the notches 52 and 53 on the upper ends of the two upright tabs 50 and 51. Once the stop members 50 and 51 are retracted, the biasing springs 48 and 49 will be effective for pivoting the channels 40 and 41 upwardly and outwardly into their respective elevated pad-releasing positions on opposite sides of the base member 11. This upward movement of the elongated channels 40 and 41 will release the outer ends 29 of the reinforcing ribs 28 from the channels so that the slacked pad member 25 will then be capable of flexing relative to the base member 11.

The release of the gripping member 25 will, of course, free the base member 11 to be moved moderately in relation to the flexible gripping member. As discussed above, once the base member 11 has been freed to move, it can then be tipped forwardly, for example, onto its forward transverse retainer member 35 to progressively raise the rear portion of the base member. In this manner, one after another of the several transverse segments 32 will be successively peeled away from the spacecraft wall in response to the upwardly-directed pulling action imposed on those segments by progressively raising the rearward portion of the now-slacked pad member 25. Hereagain, it will be recalled that the division of the pliable pad member 26 into paralleled individual segments 32 with a single reinforcing rib 28 supporting each of those segments greatly facilitates this bending of the flexible gripping member 25 as the base 11 is tilted in a heel-to-toe motion in relation to an adjacent wall surface.

Accordingly, it will be appreciated that the hand-grip tools 10 of the present invention greatly facilitates the free travel of astronauts along unplanned travel paths that may be either within or outside of orbiting spacecraft. By being free to be temporarily adhered at random locations on the wall surfaces of a spacecraft, astronauts may use these devices as needed for propelling themselves to the locations and then later remove the hand-grip tools 10 when travel is to be subsequently discontinued.

While only a particular embodiment of the apparatus of the present invention has been shown and described herein, it is apparent that various changes and modifications may be made without departing from the principles of the present invention in broader aspects; and, therefore, the aim in the claims appended hereto is to cover all such modifications and changes as fall within the true spirit and scope of this invention.

What is claimed is:

1. A portable hand-held device for attachment to selected surfaces comprising:
   a base member;
   a flexible gripping member having a central portion with a forward face bounded by longitudinal edges and opposite ends and a rearward face member formed of a flexible sheet bonded to the central portion and having enlarged end portions extending past the opposite ends of the central portion;

means for slidingly coupling said enlarged end portions of said flexible gripping member to said base member to normally position said central portion of said flexible gripping member against said base member;

attachment means on said forward face to said flexible gripping member for releasably attaching said central portion of said gripping member to a substantially complementary opposing surface; and means on said base member for retaining said central portion of said flexible gripping member against said base member whenever said flexible gripping member is in readiness for attachment to a substantially complementary opposing surface and for freeing said flexible gripping member for peeling movement away from said base member whenever said hand-held device is to be detached from the opposing surface.

2. The hand-held device of claim 1 further including means for selectively coupling a guide member to said base member.

3. The hand-held device of claim 1 further including a handle on said base member.

4. The hand-held device of claim 1 wherein said attachment means include a coating of a contact adhesive covering at least most of said forward face of said flexible gripping member.

5. The hand-held device of claim 1 wherein said forward face of said flexible gripping member is substantially flat.

6. A portable hand-grip device for attachment to selected flat surfaces in outer space comprising:
a base member having a planar face bounded by ends and opposite sides;
hand-gripping means on said base member;
a flexible rectangular pad member having forward and rearward faces respectively bounded by opposite ends and longitudinal sides;
a flexible sheet bonded to said rearward face of said flexible pad member and having transverse ends extending beyond said opposite ends of said forward face of said flexible pad member;
means slidingly coupling said ends of said rearward face of said flexible pad member to said base member for positioning said rearward face of said flexible pad member against said planar face of said base member;
means on said forward face of said flexible pad member for releasably attaching the hand-grip device to an opposite flat surface;
first means arranged on said flexible pad member and said base member for restraining said flexible pad member against flexing movement away from said planar face of said base member whenever said hand-grip device is to be attached to an opposing flat surface; and
second means on said base member operable for releasing said flexible pad member for peeling movement away from said planar face of said base member when said hand-grip device is to be detached from the opposing flat surface.

7. The hand-grip device of claim 6 wherein said first means include:
a plurality of reinforcing members mounted in a side-by-side relationship transversely across said rearward face of said flexible pad member and positioned with the opposite ends of at least a majority of said reinforcing members respectively projecting beyond said longitudinal sides of said flexible pad member;
a plurality of transverse slits cooperatively cutting across said rearward face of said flexible pad member and between said reinforcing members to promote the flexing of said flexible pad member between each of said reinforcing members; and
elongated channels disposed along said opposite sides of said base member and respectively arranged to be moved into capturing engagement with said projecting ends of said reinforcing members when said flexible pad member is to be restrained against flexing movement away from said planar face of said base member.

8. The hand-grip device of claim 7 wherein said second means include:
means on said base member for selectively moving said elongated channels away from capturing engagement with said projecting ends of said reinforcing members whenever said flexible pad member is to be freed for flexing movement away from said planar face of said base member.

9. A portable hand-grip device for attachment to selected flat surfaces in outer space comprising:
a quadrangular base member having a rearward face and a flat forward face respectively bound by opposite ends and longitudinal sides of said base member;
hand-gripping means on said rearward face of said base member;
a rectangular flexible pad member having rearward and forward faces respectively bounded by the longitudinal sides and opposite ends;
means on said forward face of said flexible pad member for releasably attaching said hand-grip device to an opposing flat surface;
means for slidingly coupling said opposite ends of said flexible pad member to said base member for positioning said rearward face of said flexible pad member adjacent to said flat forward face of said base member;
a plurality of reinforcing members mounted transversely in a side-by-side relationship across said rearward face of said flexible pad member with the opposite ends of each of said reinforcing members respectively projecting beyond said longitudinal sides of said flexible sheet;
elongated channels movably mounted on opposite sides of said base member adjacent to each of said longitudinal sides of said flexible pad member for selectively engaging said projecting ends of said reinforcing members when said flexible pad member is to be secured against flexing movement away from said base member and thereby holding said rearward face of said flexible pad member against said flat forward face of said base member when said hand-grip device is in readiness for attachment to an opposing flat surface; and
hand-actuated means on said base member for selectively disengaging said elongated channels from said projecting ends of said reinforcing members to free said flexible pad member for flexing movement away from said base member when said hand-grip device is in readiness for detachment from an opposing flat surface.

10. The portable hand-grip device of claim 9 wherein said means for coupling said opposite ends of said flexible pad member to said base member include:

a rectangular flexible sheet laid over said reinforcing members and bonded to said rearward face of said flexible pad member and having transverse ends extending beyond said opposite ends of said flexible pad member; and means on said base member for slidingly coupling said transverse ends of said flexible sheet to said base member.

11. The portable hand-held device of claim 9 further including: means cooperatively coupled to said elongated channels for engaging said elongated channels with said projecting ends of said reinforcing members until operation of said hand-actuated means for selectively disengaging said elongated channels to free said flexible pad member for flexing movement away from said base member.

12. The portable hand-held device of claim 9 wherein said means for attaching said flexible pad member to an opposing flat surface include a contact adhesive covering at least most of said forward face of said flexible gripping member.

13. The portable hand-grip device of claim 12 wherein said means for coupling said opposite ends of said flexible pad member to said base member include:

a rectangular flexible sheet laid over said reinforcing members and bonded to said rearward face of said flexible pad member and having transverse ends extending beyond said opposite ends of said flexible pad member; and means on said base member for slidingly coupling said transverse ends of said flexible sheet to said base member.

14. The portable hand-held device of claim 9 including means for selectively coupling a guide member to said base member.

15. The portable hand-held device of claim 9 including a plurality of transverse slits respectively disposed across said rearward face of said flexible pad member between said reinforcing members for promoting flexing of said flexible pad member between each of said reinforcing members when said flexible pad member is being flexed away from said base member.

* * * * *